G. E. WOOD.
METHOD OF FORMING TOOLS.
APPLICATION FILED DEC. 2, 1912.

1,069,215.

Patented Aug. 5, 1913.

WITNESSES:

INVENTOR.
George E. Wood.
BY
Arthur B. Jenkins,
ATTORNEY.

UNITED STATES PATENT OFFICE.

GEORGE E. WOOD, OF SOUTHINGTON, CONNECTICUT.

METHOD OF FORMING TOOLS.

1,069,215.  Specification of Letters Patent.  Patented Aug. 5, 1913.

Application filed December 2, 1912. Serial No. 734,428.

*To all whom it may concern:*

Be it known that I, GEORGE E. WOOD, of Southington, in the county of Hartford and State of Connecticut, have invented a new and Improved Method for Forming Tools, of which the following is a specification.

My invention relates to the making of certain hand tools, as screw drivers and like articles, and an object of the invention, among others, is to form a tool in a manner to avoid injury to the handle in the operation of securing it in place.

The object hereinabove set out, as well as others, may be attained in the construction of a tool in accordance with my invention and as illustrated in the accompanying drawings, in which—

Figure 1:
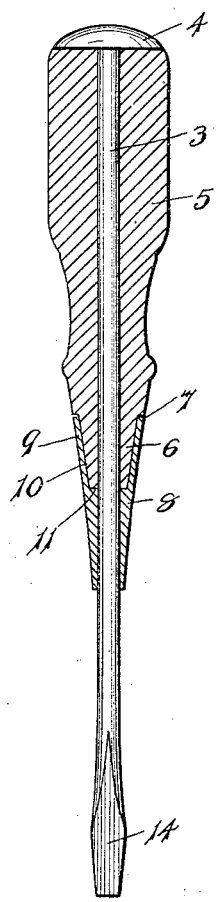
Figure 2:
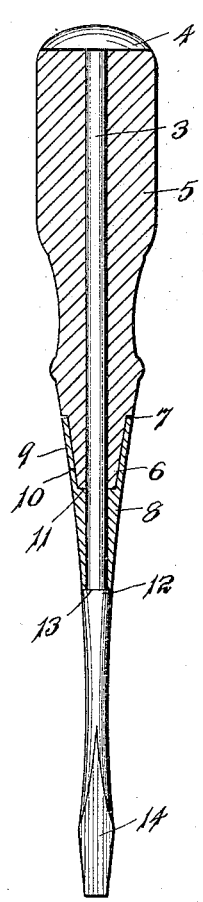

Figure 1 is a view in central longitudinal section through a tool handle showing part of the steps in securing a tool thereto in accordance with my invention. Fig. 2 is a like view illustrating the final steps in securing the handle in place.

In the construction of tools of this class it has become desirable to so form the parts that the outer surface of the tool shank, ferrule and the lower end of the handle shall constitute a smooth, continuous unbroken surface. Different ways of accomplishing this result have been employed, both by myself and others, but I have found a very satisfactory construction and one having many desirable advantages to reside in a tool in which the metal of the shank is swaged up in a manner to force the handle against its seat at the under side of the head. In thus constructing a tool, however, a difficulty has been encountered owing to the splitting or chipping off of the material composing the handle, commonly composed of wood or like material, at the point where the shouldered part of the handle comes in contact with the edge of the ferrule.

A tool constructed in accordance with my invention avoids this objectionable feature, such tool being shown herein, in which the numeral 3 denotes its shank formed from metal, preferably round in cross-section and usually of uniform diameter throughout, in the preliminary steps of the operation. A head 4 is formed upon one end of this rod of stock, which in the preliminary step, is cut to the proper length. A handle 5 of suitable form and having a central longitudinal opening for the reception of the tool shank is then placed upon this headed rod of stock with its end located against the under side of the head 4. This handle has a reduced tapered end 6 providing a shoulder 7. A ferrule 8 is then placed upon this rod of stock, by passing it on to the unheaded end. This ferrule has a recess, the walls 9 of which are of a thickness substantially equal to the depth of the shoulder 7. The length of these walls, or in other words, the depth of the recess 10, is such that the bottom 11 of the recess shall rest firmly and snugly against the extreme end of the tapered portion 6 of the handle, thus preventing pressure or force occurring between the edge of the recessed part of the ferrule and the shoulder 7. After the ferrule has been placed in position the shank of the tool is swaged up tightly against the end of the ferrule to force it snugly against the handle, this swaged portion 12 being formed in any desired manner providing a shoulder 13, between which and the under side of the head 4 the handle and ferrule are tightly secured. The handle of a tool thus formed has little chance of loosening, and liability to injury, and consequent damage and loss in constructing the tool is reduced to a minimum.

It will be understood that in the finished tool the edge of the ferrule within which the recess is formed rests closely enough in contact with the shoulder 7 to provide a smooth continuous unbroken surface, that is, without space between the parts, but without pressure at this point. In order to emphasize this feature and clearly bring out the fact that there is no pressure at this point, a slight space is shown in the drawing but it will be understood that this space does not occur in a tool constructed in accordance with the invention.

After the tool has been secured in place the end opposite the handle may be formed into any suitable shape to provide the tool desired, a screw driver blade 14 being shown herein.

While I have shown and described herein one way of constructing my improved tool it is not absolutely essential that this shall be closely followed, as it may be departed from to a greater or lesser extent without avoiding the invention.

I claim—

1. The method of making a tool that consists in forming a head at the end of a rod of stock, placing a shouldered handle thereon against said head, placing a ferrule on said rod with the end of the handle firmly seated in the ferrule, and then swaging the metal of the rod tightly against the end of said ferrule.

2. The method of making a tool that consists in forming a head at the end of a rod of stock, placing a shouldered handle thereon against said head, placing a ferrule on said rod with the end of the handle firmly seated in the ferrule, and then finally forming a shoulder on the rod by swaging the metal of the rod against the end of the ferrule.

3. The method of making a tool that consists in forming a head upon a rod of stock, placing a handle having a reduced shouldered end upon the rod against said head, placing a ferrule with a recess slightly less in depth than the length of said reduced shouldered part upon the rod with the end of the handle seated firmly against the bottom of said recess, and then swaging the metal of the shank tightly against the end of said ferrule.

GEORGE E. WOOD.

Witnesses:
THOMAS F. WELCH,
IRENE R. WOOD.

Copies of this patent may be obtained for five cents each, by addressing the "Commissioner of Patents, Washington, D. C."